United States Patent
Lucas-Woodley et al.

(10) Patent No.: US 10,140,766 B2
(45) Date of Patent: Nov. 27, 2018

(54) APPARATUS AND METHOD OF AUGMENTING VIDEO

(71) Applicant: Sony Interactive Entertainment Europe Limited, London (GB)

(72) Inventors: Thomas Edward Lucas-Woodley, London (GB); Nicholas Andrew Lord, London (GB); William Oliver Sykes, London (GB); Adrien Bain, London (GB)

(73) Assignee: Sony Interactive Entertainment Europe Limited (GB)

( * ) Notice: Subject to any disclaimer, the term of this patent is extended or adjusted under 35 U.S.C. 154(b) by 526 days.

(21) Appl. No.: 13/900,987

(22) Filed: May 23, 2013

(65) Prior Publication Data

US 2013/0321464 A1    Dec. 5, 2013

(30) Foreign Application Priority Data

Jun. 1, 2012 (GB) .................................. 1209835.6

(51) Int. Cl.
*G09G 5/00* (2006.01)
*G06T 19/00* (2011.01)
(Continued)

(52) U.S. Cl.
CPC .......... *G06T 19/006* (2013.01); *A63F 13/213* (2014.09); *A63F 13/428* (2014.09);
(Continued)

(58) Field of Classification Search
CPC .................................................. G06T 19/006
(Continued)

(56) References Cited

U.S. PATENT DOCUMENTS

| 2012/0223968 A1* | 9/2012 | Kashimoto | 345/633 |
| 2012/0306917 A1* | 12/2012 | Sakurai et al. | 345/633 |
| 2013/0201185 A1* | 8/2013 | Kochi | 345/419 |

FOREIGN PATENT DOCUMENTS

| EP | 2045774 A1 | 4/2009 |
| EP | 2426641 A1 * | 7/2010 | ............... G06T 7/00 |

(Continued)

OTHER PUBLICATIONS

GB Combined Search and Examination Report, 9 pages, dated Oct. 30, 2012.
Extended European Search Report for Application EP 13168428, dated Sep. 13, 2016.
(Continued)

*Primary Examiner* — Ke Xiao
*Assistant Examiner* — Gordon Liu
(74) *Attorney, Agent, or Firm* — Lerner, David, Littenberg, Krumholz & Mentlik, LLP

(57) ABSTRACT

A method of generating an internally consistent model of the state of a book captured in a video image is provided. The method comprises obtaining a plurality of pieces of evidence relating to the state of a corresponding plurality of aspects of the book in the video image, associating a quality score with each piece of evidence, generating an initial model of the state of the book wherein the state of the book is constrained by physical properties of the book and at least the highest scoring piece of evidence, and sequentially constraining the model in response to one or more successive pieces of evidence whose scores meet a respective predetermined first threshold value.

18 Claims, 11 Drawing Sheets

(51) Int. Cl.
  *A63F 13/65* (2014.01)
  *G06T 11/00* (2006.01)
  *A63F 13/428* (2014.01)
  *A63F 13/213* (2014.01)
  *A63F 13/5255* (2014.01)
  *A63F 13/98* (2014.01)

(52) U.S. Cl.
  CPC .......... *A63F 13/5255* (2014.09); *A63F 13/65* (2014.09); *A63F 13/98* (2014.09); *G06T 11/00* (2013.01)

(58) Field of Classification Search
  USPC ........................................................ 345/633
  See application file for complete search history.

(56) References Cited

FOREIGN PATENT DOCUMENTS

EP        2426641 A1 *  3/2012
KR     20110091126 A     8/2011

OTHER PUBLICATIONS

Gupta et al., The Universal Media Book: Tracking and Augmenting Moving Surfaces with Projected Information, IEEE Symposium on Mixed and Augmented Reality 2006, pp. 177-180, Oct. 1, 2006.
Yang et al., Hybrid Visual Tracking for Augmented Books, Correct System Design, Lecture Notes in Computer Science, Springer International Publishing, pp. 161-166, Sep. 25, 2008.

* cited by examiner

APPARATUS AND METHOD OF AUGMENTING VIDEO

CROSS REFERENCE TO RELATED APPLICATIONS

The present application claims the benefit of and priority to GB Application No. 1209835.6, filed Jun. 1, 2012, the entire disclosure of which is incorporated by reference herein.

BACKGROUND OF THE INVENTION

Field of the Invention

The present invention relates to an apparatus and method of augmenting video.

Description of the Prior Art

Augmented reality systems are known that use a video camera coupled to a computer to capture a video image, detect features of that captured video image, and then in response to the detected features, generate a graphical overlay to superpose on the captured video image which in some fashion augments the captured video image.

Referring to FIG. 1, in a typical augmented reality application a so-called fiduciary marker 800 of a known size is included in the scene to be captured by the video camera, in order to provide an easily detectable feature.

Fiduciary markers are typically high-contrast (e.g. black and white) and asymmetric patterns, so providing scope for pattern recognition in even relatively poor image capture conditions (e.g. with low resolution image capture, poor lighting, and the like). Such recognition typically provides an estimation of the position (x and y axis position) and rotation (by virtue of the marker's asymmetry) of the fiduciary marker within the captured video image.

Optionally in addition the distance of the fiduciary marker (its z-axis position) from the video camera may be estimated by comparing the size of the fiduciary marker in the captured image with a known size of the fiduciary marker (e.g. its size in pixels at a distance of 1 meter). Similarly, optionally a tilt of the fiduciary marker (i.e. its deviation from the x-y plane in the z direction) may be estimated by comparing the aspect ratio of the fiduciary marker in the captured image with the known aspect ratio of the fiduciary marker, and/or using other techniques such as detecting foreshortening (where a rectangular shape appears trapezoidal) or other distortions of the fiduciary marker in the captured video image.

The generated graphical overlay typically comprises a virtual graphics element that can then be superposed over the fiduciary marker, with the estimated position, rotation, distance, and tilt of the fiduciary marker used to modify the virtual graphics element as applicable.

The augmented image is then output to a display.

The subjective effect of this process is that the output video image comprises a graphical element (for example a monster or a castle) in place of the fiduciary marker, typically replicating the estimated position, rotation, distance and tilt of the fiduciary marker.

Alternatively, the fiduciary marker can be used in other ways. For example a graphical object can be positioned relative to the fiduciary marker but not covering it, or the fiduciary marker can be used to identify to an entertainment system or other computer a selected object or region of a scene; for example, placing a fiduciary marker on a table may cause an entertainment system to identify the table (for example by identifying a contiguous region of colour within a tolerance of the colour found near the fiduciary marker), after which the fiduciary marker can be removed.

However, it will be appreciated that in such augmented reality systems, the user's suspension of disbelief, which makes them complicit in the illusion that the graphical overlay is part of the captured scene, is at least in part dependent upon the reliability with which the graphical overlay matches or interacts with some real-world aspect of the scene. This reliability is frequently dependent upon estimates of the position and orientation of the fiduciary marker within the scene.

Thus it is desirable to reduce the occasions upon which such estimates cannot be reliably made.

SUMMARY OF THE INVENTION

The present invention seeks to mitigate or alleviate the above problem.

In a first aspect a method of generating an internally consistent model of the state of a book captured in a video image is provided in accordance with claim 1.

In another aspect a method of generating an augmented reality image is provided in accordance with claim 7.

In another aspect an entertainment device for generating an internally consistent model of the state of a book captured in a video image is provided in accordance with claim 9.

In another aspect an augmented reality system is provided in accordance with claim 15.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

An apparatus and method of augmenting video are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
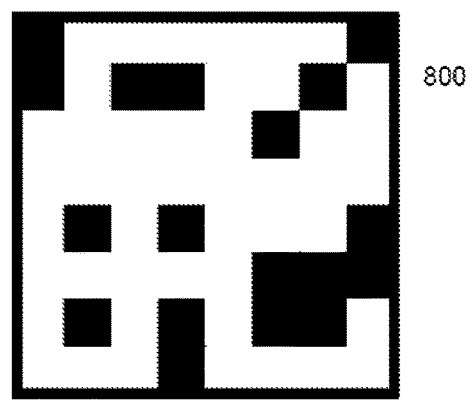
FIG. 1 is a schematic diagram of a fiduciary marker.
Figure 2A:
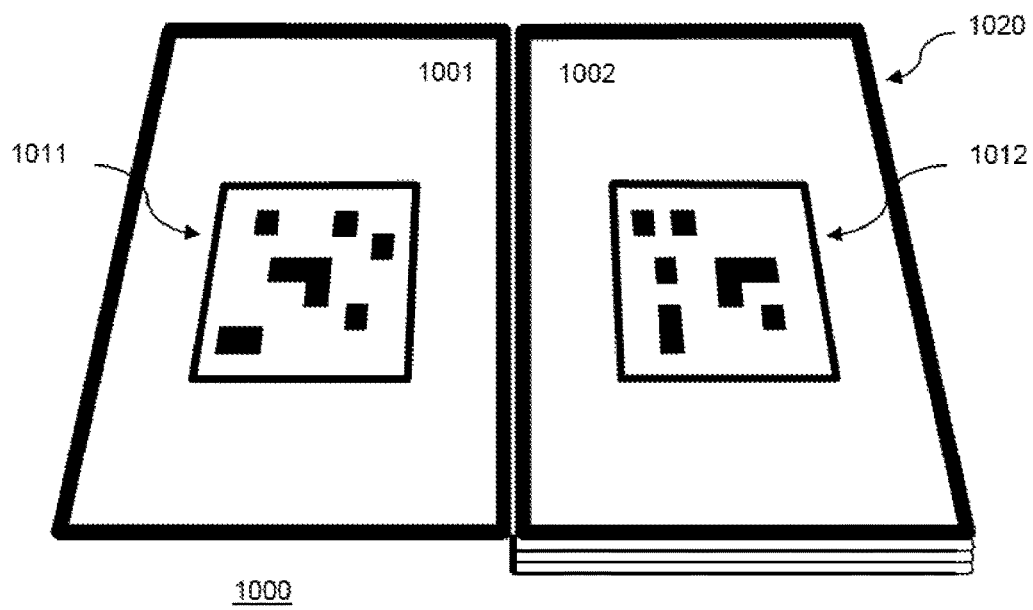
FIG. 2A is a schematic diagram of a book in accordance with an embodiment of the present invention.
Figure 2B:
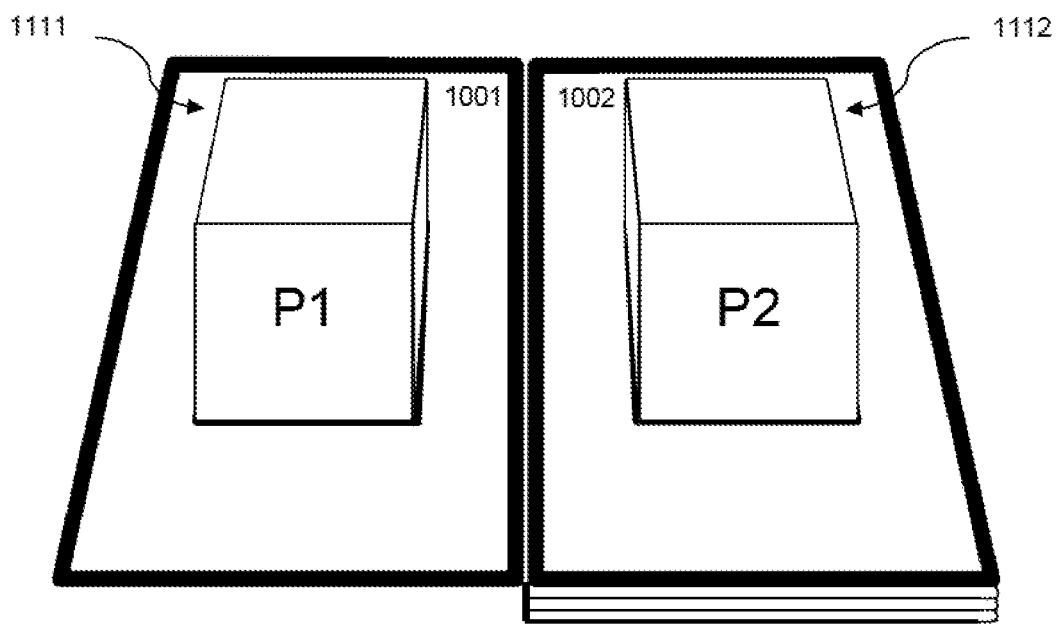
FIG. 2B is a schematic diagram of an augmented video image of a book in accordance with an embodiment of the present invention.

Referring now to FIGS. 2A and 2B, in an embodiment of the present invention a book 1000 has a plurality of rigid, turnable leaves (a so-called 'board book'), and comprises fiduciary markers 1011, 1012 on each page 1001, 1002, as shown in FIG. 2A. A leaf will be understood to be a single turnable sheet or panel of a book and typically comprises a page on each side. FIGS. 2A and 2B show, by way of example, pages 1 and 2 (respectively labelled 1001 and 1002). Optionally the inside front and/or back covers of the book may also act as pages and comprise fiduciary markings. Hence in this example, page 1 may in fact be the inside front cover. Similarly, optionally the outside front and/or back covers may comprise fiduciary markings. In addition, optionally each page is edged with a high contrast marking 1020 at the outside edges to facilitate detection of the extent of the page.

An entertainment device coupled to a video camera can capture an image of the book and use known techniques to detect the fiduciary markings on each visible page and hence locate those pages of the book. Given this information, then as illustrated in FIG. 2B an entertainment device can augment the captured video image of the book with virtual graphic elements 1111, 1112 corresponding to the placement, scale and orientation of the fiduciary markings 1011, 1012 on the visible pages, and output the augmented video image for display. In this way the displayed version of the book becomes a 'magic' pop-up book in which the pages can come to life.

It will be appreciated that an AR application that seeks to completely replace the book captured within the video image with an augmented version in the above described manner may gather information about the state of many aspects of the book in the current video frame in order to implement a convincing substitution of the book in the output image.

Figure 3:
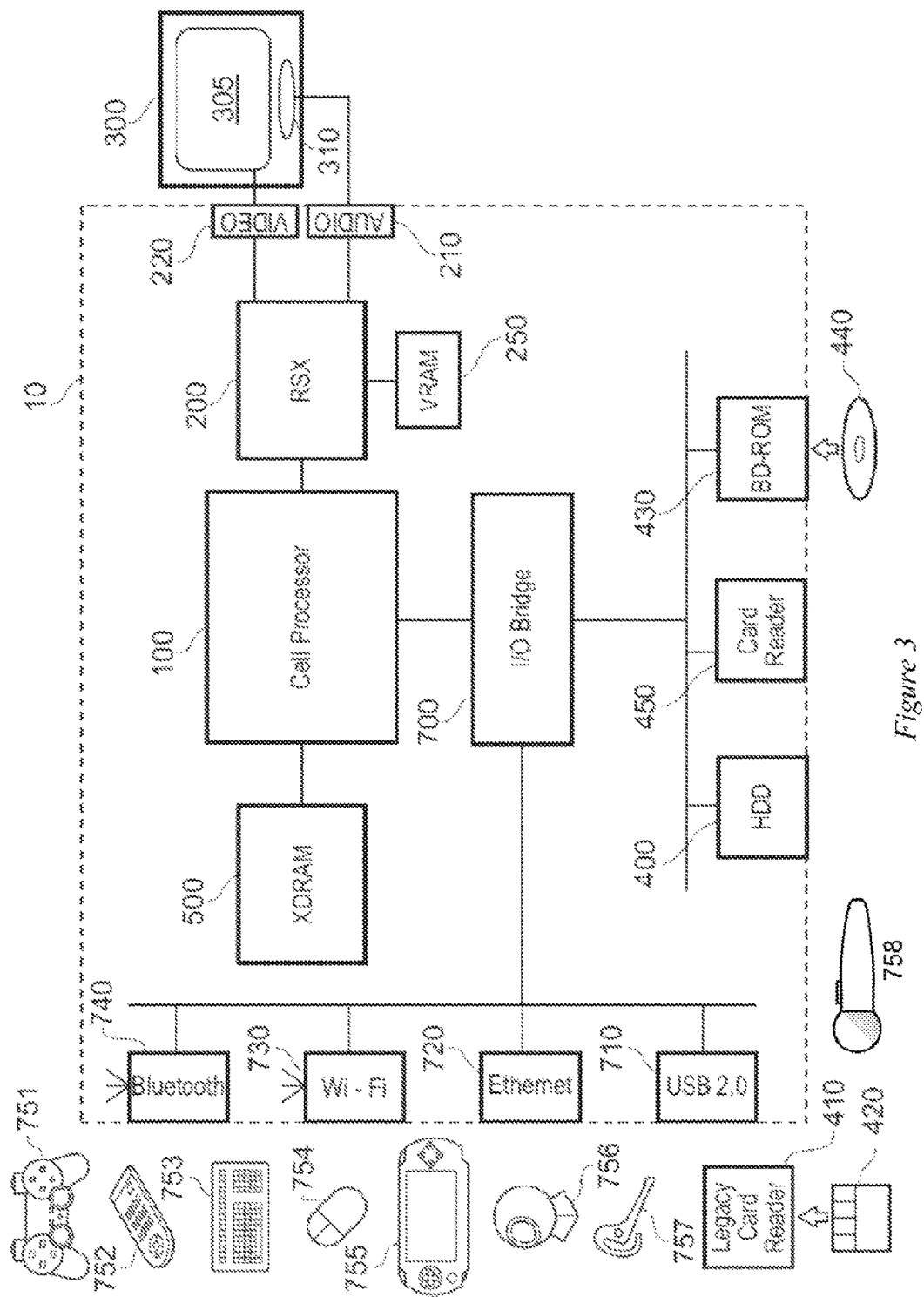
FIG. 3 is a schematic diagram of an entertainment device book in accordance with an embodiment of the present invention.

FIG. 3 schematically illustrates the overall system architecture of a suitable entertainment device known as the Sony® Playstation 3® entertainment device or PS3® that may implement such an AR application under suitable software instruction. The PS3 comprises a system unit 10, to which various peripheral devices are connectable including a video camera, as detailed below.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

to The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

In particular, these connections enable a video camera such as an EyeToy® video camera 756 (or a stereoscopic video camera, not shown) to be coupled to the PS3 in order to capture a video image (or stereoscopic video image pair) of the book.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analog joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the portable entertainment device 755 or the Playstation Move® 758 may be used as a controller. In the case of the portable entertainment device, additional game or control information (for example, control instructions or number of lives) may be provided on the screen of the device. In the case of the Playstation Move, control information may be provided both by internal motion sensors and by video monitoring of the light on the Playstation Move device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In embodiments of the video camera, it is stereoscopic. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled person will be aware that a device driver or similar software interface may be required in the present embodiment described.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Figure 4:
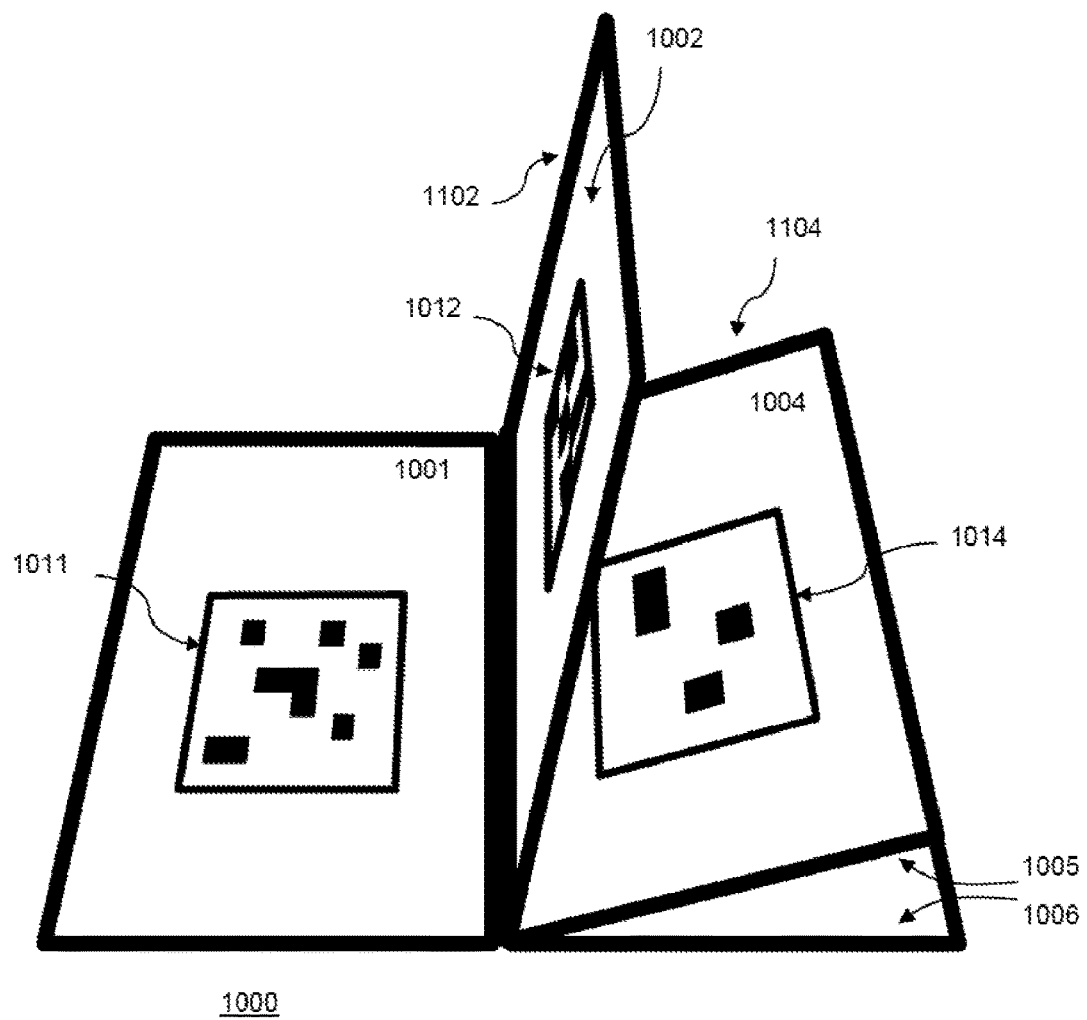
FIG. 4 is a schematic diagram of a book in accordance with an embodiment of the present invention.

Referring now to FIG. 4, it will be appreciated that whilst the state of the fiduciary markers may be readily detected when the book is laid open and flat, problems may arise from the process of turning leaves of the book.

Firstly, it will be appreciated that as a user turns over a rigid leaf 1102 of the board book 1000, then for example pages 1 and 2 become obscured whilst page 3 (not shown, but located on the face of the leaf 1102 opposite to page 2) and page 4 (1004) are revealed. When the turning action is complete and pages 3 and 4 are fully revealed, the system can provide image augmentation of pages 3 and 4 in a similar manner to that previously described for pages 1 and 2 with reference to FIG. 2B.

However, a problem that arises is that during the process of turning these pages there comes a point where the fiduciary marker 1012 on page 2 (for example) becomes so distorted by being viewed nearly edge-on to the camera that it is no longer recognisable by the entertainment device. At this point it becomes preferable to use an alternative technique of determining the position of the turning leaf of the book so that any animations dependent upon it (for example a pop-up animation showing objects between pages 1 and 2 folding down, or unfolding between pages 3 and 4) are able to continue appropriately.

Such a technique is described in co-pending European application 10175548.6, incorporated herein by reference. A brief summary of the technique is described below with reference to FIG. 5.

In a first step s10, a scene comprising the book is captured by a video camera or similar image capture device operably coupled to an image input of the PS3 (such as a USB port), resulting in an image including the book. As noted previously, the book itself comprises substantially rigid leaves.

In a second step s20, the PS3 attempts to detect fiduciary markings in the image (i.e. those visible in the book), for example using the Cell processor operating under suitable software instruction as a marking detector. Typically not all of a fiduciary marker is required to identify it if it comprises some form of spatially distributed redundancy in its markings.

In a third step s30, the image or partial image of the of the fiduciary marker on a page of the book is compared with a reference version of the marker to determine orientation and scale, and given a known physical relationship to the page (i.e. its printed position) this also provides an estimate of the orientation and scale of the book and in particular the placement of the spine of the book, which acts at the origin of rotation for the leaves of the book. Again the Cell processor may perform the comparison and the estimate the placement of the spine of the book, and the reference versions of the markers may be stored in RAM, on the hard disc, on an optical disk or on remote storage, or any other suitable storage medium or combination thereof, as may the dimensions of the book and the expected positions of the markers therein.

Based upon the origin of rotation coincident with the spine of the book, in a fourth step s40 a plurality of possible positions for a turning leaf of the book are hypothesised. In particular, given the size of the leaf then the positions of the free edges of the leaf are hypothesised. Thus as a non-limiting example, hypotheses for page positions in the range 10 to 170 degrees may be generated at increments of 4 degrees. Again here the Cell processor may operate as the hypothesising means.

To provide a basis of comparison with these hypotheses, in a fifth step s50 the captured image is processed to generate an image in which edges are identified. In addition data indicating the directions of these edges can be generated. The image processing may be performed by the Cell processor, the Reality Synthesiser graphics unit or a combination of the two.

In a sixth step s60, the hypothesised edges of the turning leaf of the book are each evaluated with respect to the image comprising the identified edges and optionally the directions of these edges using one of several possible scoring criteria, such as a distance-based criterion that generates a score proportional to how close an identified edge is to a hypothesised edge. Again this evaluation or comparison may be performed using the Cell processor operating under suitable software instruction. Typically however, it is not necessary to compare each hypothesised edge with all the pixels of the processed image.

In a seventh step s70, the hypothesis whose predicted free edges of the turning leaf generate the best score is assumed to be the best match to the actual turning leaf's position, with the Cell processor performing the selection of this hypothesis.

Finally in an eighth step s80 a virtual graphic element such as a picture or a polygonal object (e.g. a 2D rendering of a 3D virtual object) is superposed or otherwise incorporated into the captured image to augment it at a position and orientation consistent with the winning hypothesis. This image augmentation may be achieved by the Reality Synthesiser graphics unit combining the video and graphical elements, typically according to instructions from the Cell processor. The virtual graphic element itself may be stored locally in RAM, on the hard disc, or on an optical disk, may be remotely stored, or may be the product of a procedural graphics generation process such as a tree growth process.

Figure 5:
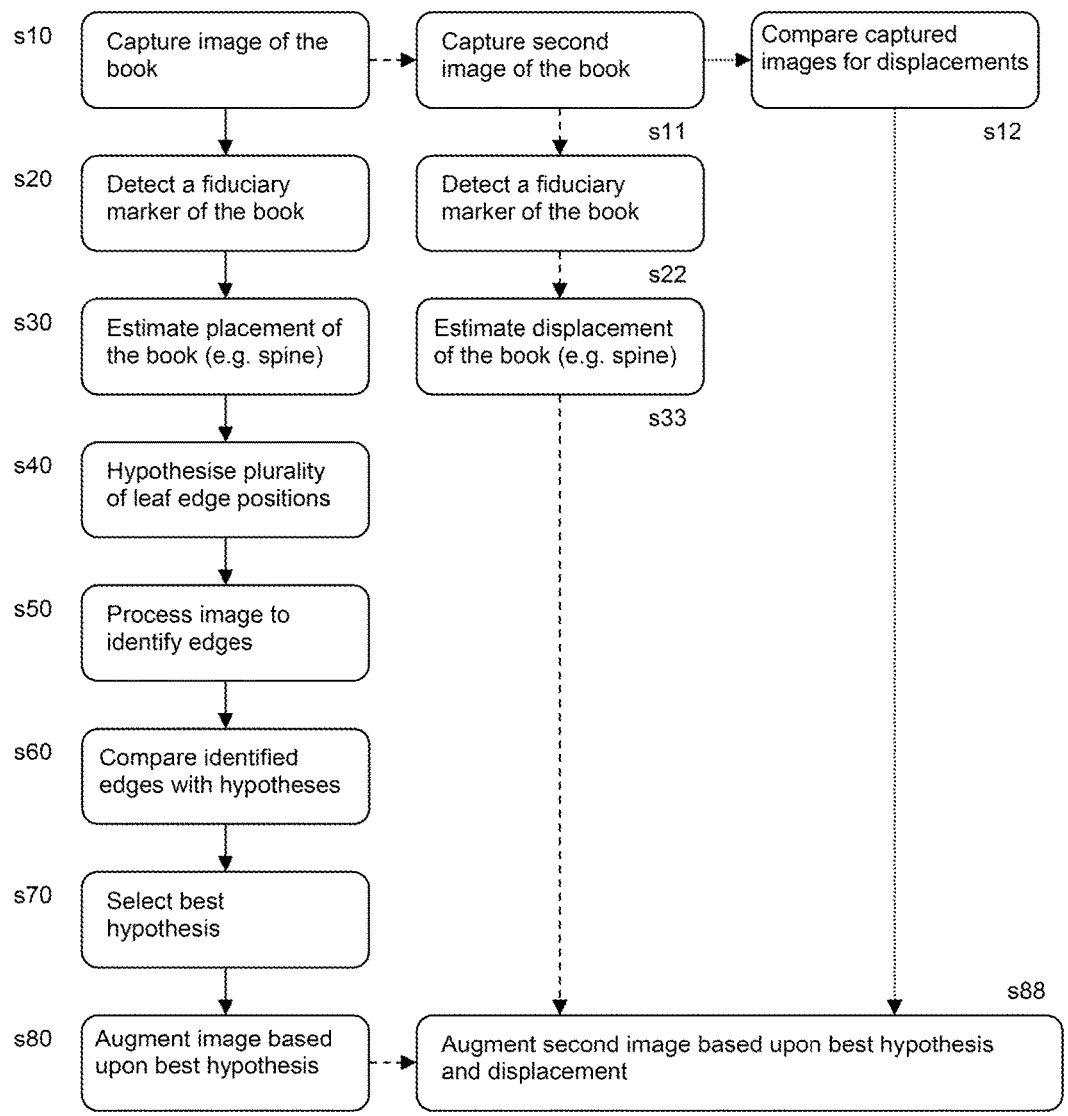
FIG. 5 is a flow diagram of a method of estimating the angle of a turning leaf of a book in accordance with an embodiment of the present invention.

Other possible steps are shown in FIG. 5 using dashed arrows. These include steps s11, s22, s33, which replicate steps s10, s20, and s30 for a second image of a stereoscopic image pair, and step s88, which replicates step 80 for an offset position (displacement) in the second image. Similarly, using dotted arrows step s12 provides an alternative determination of the displacement to that of s11, s22 and s33 using a direct image comparison for a stereoscopic image pair, for example by the Cell processor. In either case, this enables 3D augmentation for a stereoscopic display.

It will be appreciated that the above steps need not necessarily all be implemented in the above order. For example, the fifth step s50 may occur immediately after the first step s10.

It will also be appreciated that the initial hypothesis set may be distributed in a non-linear fashion, with a higher density of hypotheses near an expected position for the turning leaf (e.g. as predicted from the rate of turn in the last N video frames). Similarly within the selected range a number of prime hypotheses (such as the previously wining hypothesis from the previous frame) may be made the centre of a higher density of hypotheses.

Hence it will be appreciated that in estimating the overall state of the book, an AR application may estimate the identity and position, orientation etc., of one or more complete or partial fiduciary markers, and may also estimate the position of one or more turning leaves of a book. In each case, the estimation process may also return confidence values for the estimates provided (for example depending on the relative angle or completeness of a fiduciary marker, or the score of the winning hypothesised edge).

In addition to the above estimates, the AR application may receive or estimate other indicators of the state of the book.

Figure 6:
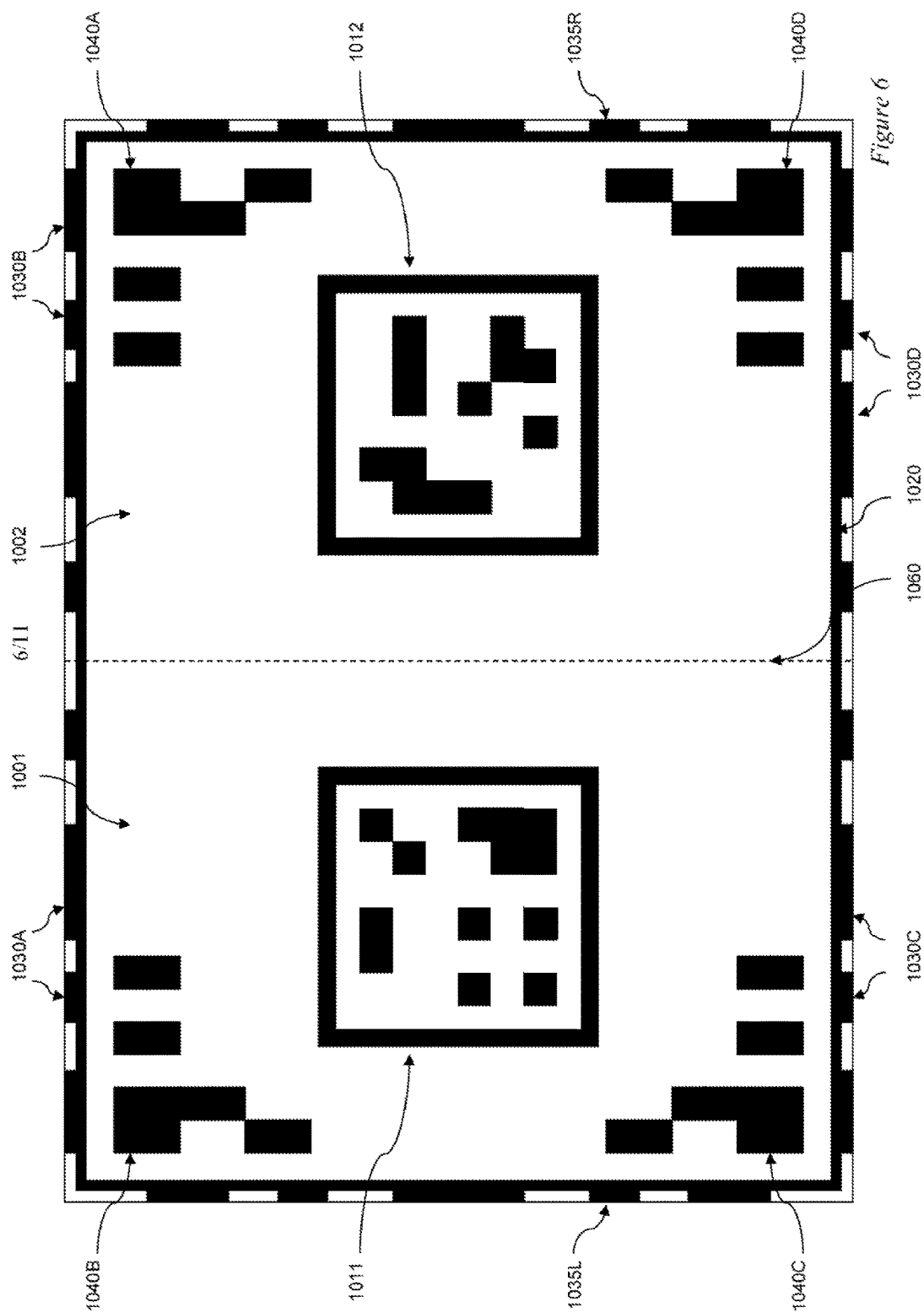
FIG. 6 is a schematic diagram of a two-page spread of a book in accordance with an embodiment of the present invention.

Referring now also to FIG. 6, to illustrate this, a typical two-page spread of a book for use with such an AR application in an embodiment of the present invention is shown. Each page (1001, 1002, etc.) comprises at least one respective fiduciary marker (1011, 1012) positioned substantially in the middle of the page, as described previously.

Each fiduciary marker on these pages comprises a different respective asymmetric pattern capable firstly of indicating the scale and orientation of the book to an augmented reality application, as described above, and secondly of indicating the respective page (i.e. which page of the book it is). It will be appreciated that an augmented reality application operable with the book will hold reference or template copies of each fiduciary marker, and that each marker will be associated with a particular page of the book. Consequently identification of a marker also identifies the page it is printed on or attached to.

In addition, on each page a non-alphanumeric pattern (1040A, 1040B) is positioned closer to an outside edge of the page of the book than the fiduciary marker. Typically, this non-alphanumeric pattern is positioned between the fiduciary marker and the edge of the page that, in normal use, is furthest from the user of the book. This edge is thus also closest to the video camera for the most typical usage of the book, in which the video camera is positioned close to the TV on which the augmented images are to be displayed, and the user is facing the TV. The non-alphanumeric pattern can similarly be positioned between a corner of the fiduciary marker and the corner of the page formed by the further page edge from the user and the lateral outside page edge (the left or right outside page edge, depending on the page), as illustrated in FIG. 6.

Notably, the non-alphanumeric pattern can thus form an 'L' shape (i.e. follow the outer edge of the book around the corner). In this case the non-alphanumeric pattern is therefore positioned closer to both edges than the fiduciary marker.

This non-alphanumeric pattern is capable in principle of indicating at least the opposing page pair (e.g. pages 1 and 2 as illustrated in FIG. 6) comprising the respective page on which the non-alphanumeric pattern is positioned. Hence in the illustrated example, the non-alphanumeric pattern is unique to the pair of pages 1 and 2. Optionally, the non-alphanumeric pattern could be unique to a single page, but this could potentially require a more complex pattern as it doubles the number of unique patterns required in the book.

Because of its position closer to the edge of the book, the non-alphanumeric pattern of a given page is revealed earlier in the process of turning the leaf or leaves above it. This allows appropriate augmentation of the page as it is revealed before it is identified using the centrally positioned fiduciary marker.

Notably, unlike the fiduciary marker, the non-alphanumeric pattern is not needed to initially determine the position, scale or orientation of the book. As a result the non-alphanumeric pattern can in principle be ambiguous in terms of scale or orientation, as these aspects of the pattern can be resolved with reference to the fiduciary markers in the book.

Instead, the non-alphanumeric pattern relies on disambiguation of its scale and orientation by reference to a visible fiduciary marker. For example, referring back to FIG. 4, if a non-alphanumeric pattern was revealed in the corner of page 6 (reference no 1006 in FIG. 4) then its scale and orientation may be determined by reference to the fiduciary marker 1011 on page 1 in the illustrated example, and also any optional book tracking algorithm based upon the page edges 1020.

Notably therefore the non-alphanumeric pattern can be arranged on opposing pages as a mirror image about the spine of the book as shown in FIG. 6 to appear more pleasing to the user, without affecting its functionality.

It will be appreciated that the non-alphanumeric pattern can also be mirrored about a centre line between the two outside edges of the page (i.e. the top and bottom edges, as the left or right edge does not have a corresponding opposite outside edge but instead ends at the spine).

Consequently a two-page spread may have four copies of the same non-alphanumeric pattern 1040A-D, each rotated by 90 degrees to another, and having a rotational symmetry about the midpoint of the spine of the book.

This means that if the user of the book holds it upside-down, a copy of the non-alphanumeric pattern will still be visible to the camera for the purpose of early indication of the newly revealed page(s).

Hence it will be appreciated that in estimating the overall state of the book, an AR application may also estimate the identity of all or part of one or more a non-alphanumeric patterns.

In addition to the markings on the leaves of the book, in this embodiment the book has a cover having larger dimensions than the leaves of the book, and hence having extremities that extend beyond the outer edges of each page when viewed from above as in FIG. 6.

The cover comprises a high contrast pattern along at least a first such extremity (1030A). It will be appreciated that the pattern is thus printed on the inside cover at and near to the outer edge of the cover.

As with the non-alphanumeric pattern, the pattern may be mirrored about the spine (and hence appear on the inside front and back covers) and may also be mirrored about a centreline between the top and bottom of the pages, to form four copies of the high contrast pattern (1030A-D).

The pattern may encode information about the book (for example a title number) or may simply be random. A typical high contrast pattern may encode in the order of 6 to 20 bits. The light and dark elements of the pattern may adhere to a regular spacing scheme or have arbitrary spacing.

In addition, a high contrast pattern (1035L,R) may also be positioned along the lateral extremities of the book. This high contrast pattern may be the same as the high contrast pattern mentioned above, or may encode the same information in a different way, or encode different or additional information, or be random.

In any of the above cases, it will be appreciated that the covers have a predetermined thickness. Consequently, in an embodiment of the present invention, the high contrast pattern extends over the edge of the cover and across at least a predetermined proportion of the thickness of the cover, to improve its visibility at very acute angles with respect to the video camera.

The patterns on the cover may be used to provide a further estimate of the orientation of the book by comparison with reference patterns. In addition, the patterns may be used to detect whether a user is just turning one or more leaves of the book, or also turning the front or back cover (e.g. to close the book), since these patterns will only rotate with respect to the spine of the book if the user is closing it. Therefore when the book is being closed, this can be used to suppress the display of a generic page surface being revealed by the turning process (which can be used to fill-in the book until a page is recognised).

Hence it will be appreciated that in estimating the overall state of the book, an AR application may also estimate the identity of all or part of a cover edge pattern, as well as its orientation, current rotation about the spine, etc.

In addition, the AR application may generate additional estimates of the state of the book based upon some or all of the above estimates. For example, the AR application may generate confidence values for positions of the book and the leaves of the book according to what is detected as being visible in the current frame. It will be appreciated that if a leaf of the book is being turned, then different parts of the book will be visible depending both on the angle of the leaf and the orientation and angle of the book. Hence if certain features of the book can be detected, this can be used to exclude certain angles and/or orientations from consideration.

Figure 7A:
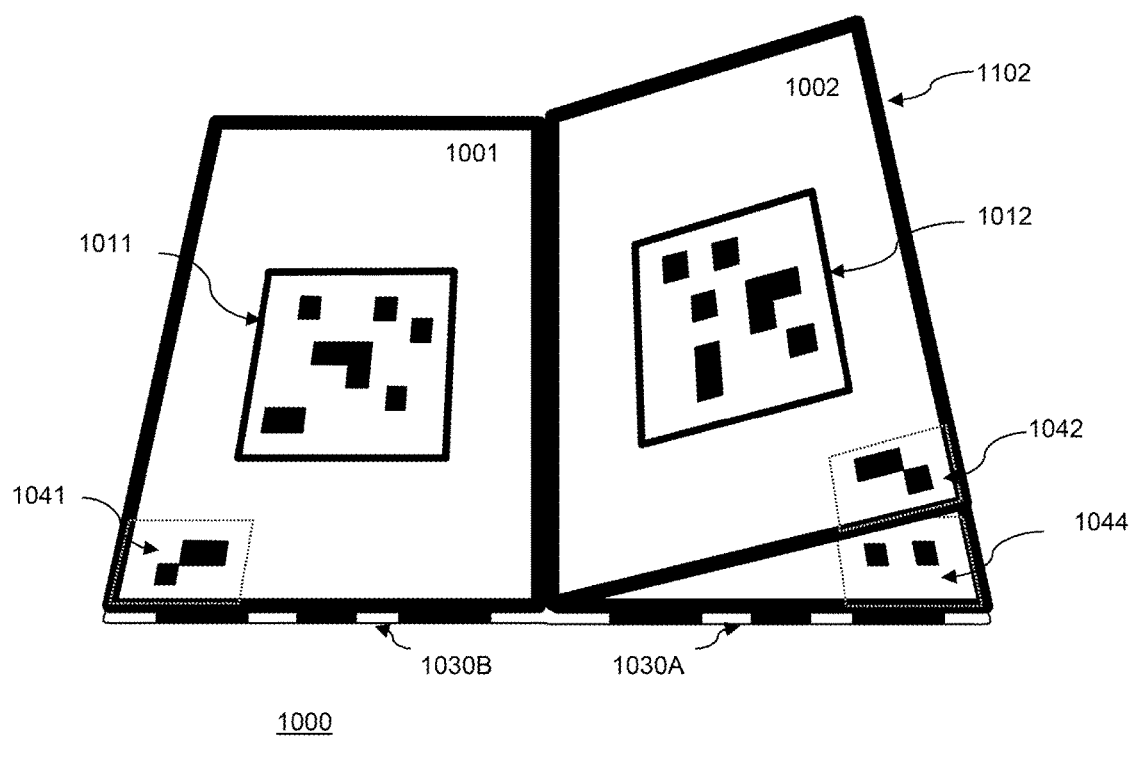
FIGS. 7A and B are schematic diagrams of a book in accordance with an embodiment of the present invention.
Figure 7B:
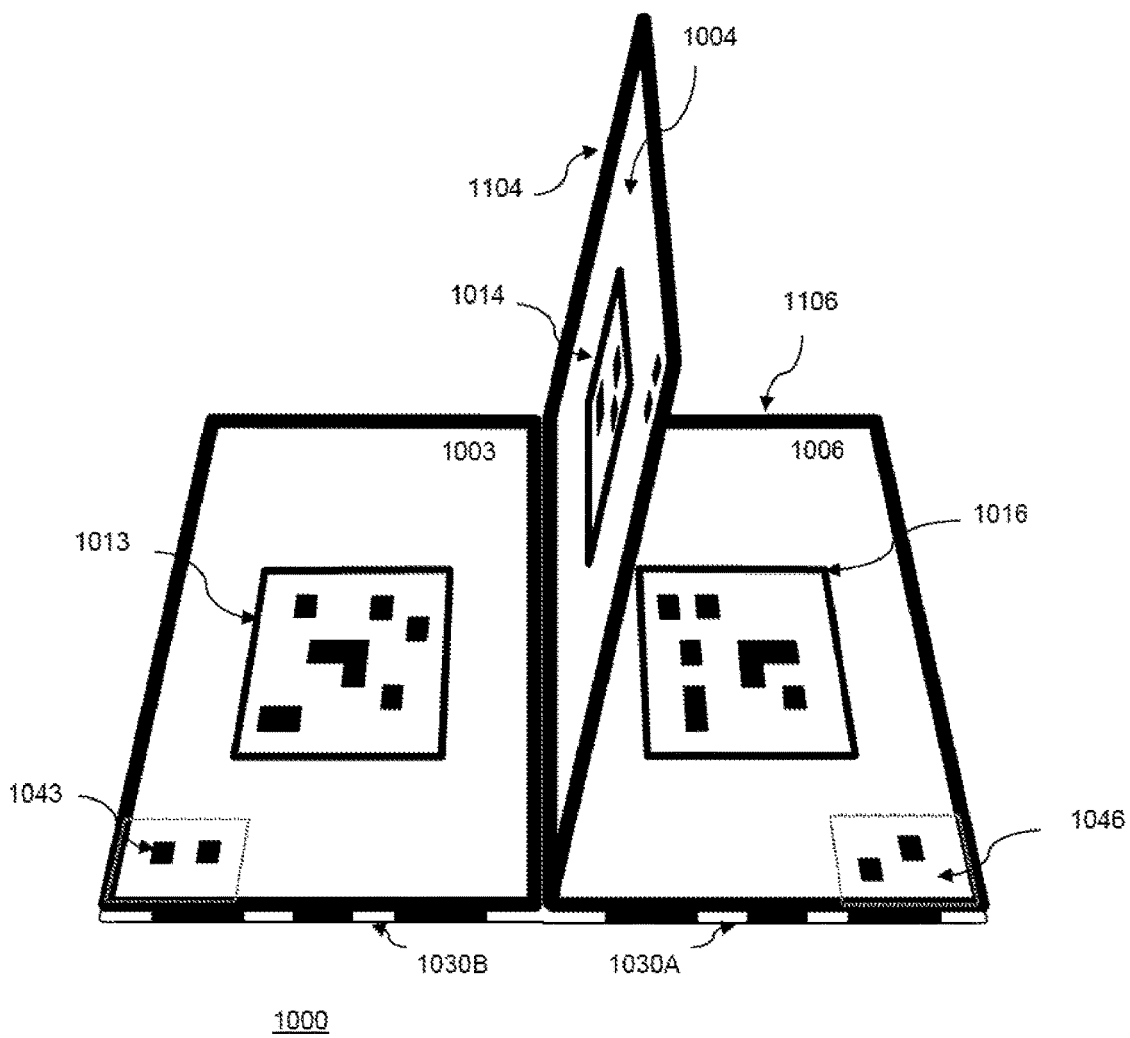

Hence for example, referring now also to FIGS. 7A and 7B, two leaves are shown at different stages of rotation about the spine of the book. Taking leaf 1102 in FIG. 7A first, it can be seen that this leaf is identified using the fiduciary markers 1011, 1012 on pages 1 and 2 (1001 and 1001) of the book. At this stage it is possible that the angle of the turning leaf of the book can be estimated from the resulting distortions of the fiduciary marker in the captured image of the book as compared with a reference template of the marker held in the PS3' s memory.

However, alternatively or in addition (for example if the book is relatively small in the video image, or glare is making the fiduciary marker on page 2 hard to resolve), the above page turning estimation technique may be used, and modified according to the above visibility constraint model.

In this case, the non-alphanumeric marker 1044 of the following page pair is detectable, but the fiduciary marker 1014 on the following page is not. For the current position and orientation of the book, this means that the turning page is likely to lie in the range 15 to 75 degrees, where 0 degrees is horizontal (flat on the book) and 90 degrees is vertical (perpendicular to the book), about the axis of the spine of the book. If the non-alphanumeric marker of the following page had not been detectable, then the turning page would be likely to lie in the range 0 to 15 degrees.

Similarly, taking leaf 1104 in FIG. 7B as a second example, it can be seen that the identity of this leaf can be estimated using the fiduciary marker 1013 on page 3 (1003) of the book. At this stage of rotation it is unlikely that the fiduciary marker 1014 on page 4 (1004) of the book can be resolved directly, and so the system is dependent primarily on the above technique of FIG. 5 to estimate the position of the turning leaf. In this case, both the non-alphanumeric marker 1046 and fiduciary marker 1016 of the following page 6 (1006) are detectable, and as noted above the fiduciary marker 1013 on page 3 of the book is also visible. For the current position and orientation of the book, this means that the turning page is likely to lie in the range 75 to 105 degrees.

It will be appreciated that as a leaf completes the second half of the turn, fiduciary markers and non-alphanumeric markers on the page now being successively covered by the leaf can be similarly used by the visibility constraint model to estimate the likely range of angles of the turning leaf, and that more generally any salient markings of the book may be used at any time.

Figure 8A:
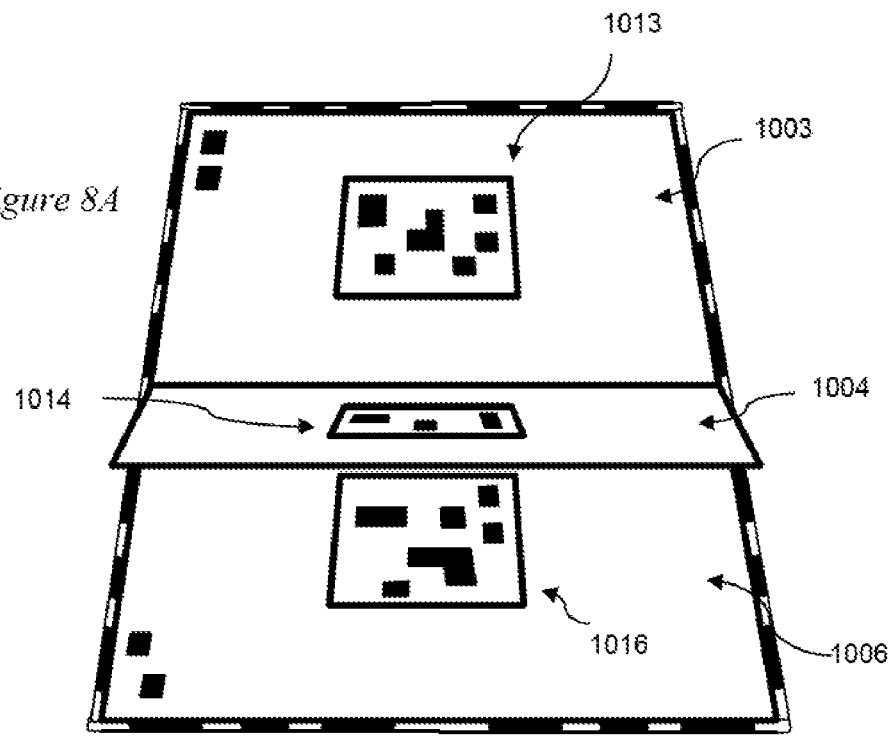
FIGS. 8A and B are schematic diagrams of a book in accordance with an embodiment of the present invention.
Figure 8B:
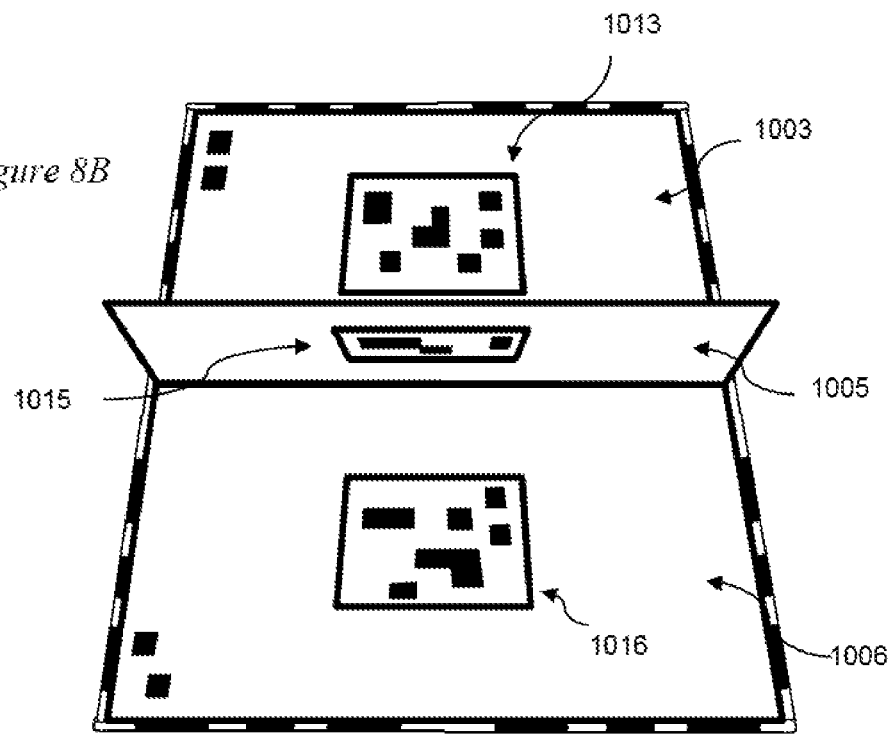

Turning now also to FIGS. 8A and 8B, these illustrate the interplay between the angles of the turning leaves and the orientation of the book. FIGS. 8A and 8B also illustrate stages in the turning of leaf 1104 as previously shown in FIG. 7B. In FIG. 7B it was noted that the visibility of fiduciary markers 1013 and 1016 meant that for the position and orientation of the book seen in FIG. 7B, the angle of the leaf was likely to lie in the range 75 to 105 degrees. However, for the position and orientation shown in FIGS. 8A and 8B, it can be seen that the visibility of fiduciary markers 1013 and 1016 means that the angle of the leaf is likely to lie in the range of 40 to 60 degrees.

Hence the AR application can take account of the expected appearance of the pages of the book, and the position and orientation of the book with respect to the video camera, as computed with reference to a detected fiduciary marker, when estimating the likely range of angles of a currently turning leaf.

This estimated likely range of angles may then be used to modify the page turning estimation method of FIG. 5 in one or more of the following ways.

Firstly, the range of hypotheses implemented may be reduced in response to the likely range. For example, rather than implementing a range of hypotheses between 10 degrees and 170 degrees in 4 degree steps (for example), a range of hypothesis between 30 and 70 degrees may be implemented in 2 degree steps (for example in response to the view shown in FIG. 8A or 8B, indicating a range of 40 to 60 degrees). Secondly, alternatively or in addition, the scores awarded to hypotheses may be weighted according to whether they lie within the likely range identified by the visibility constraint model.

It will be appreciated that in either case the range alteration or the weighting may be a function of visibility evidence from multiple aspects of the book.

Figure 9:
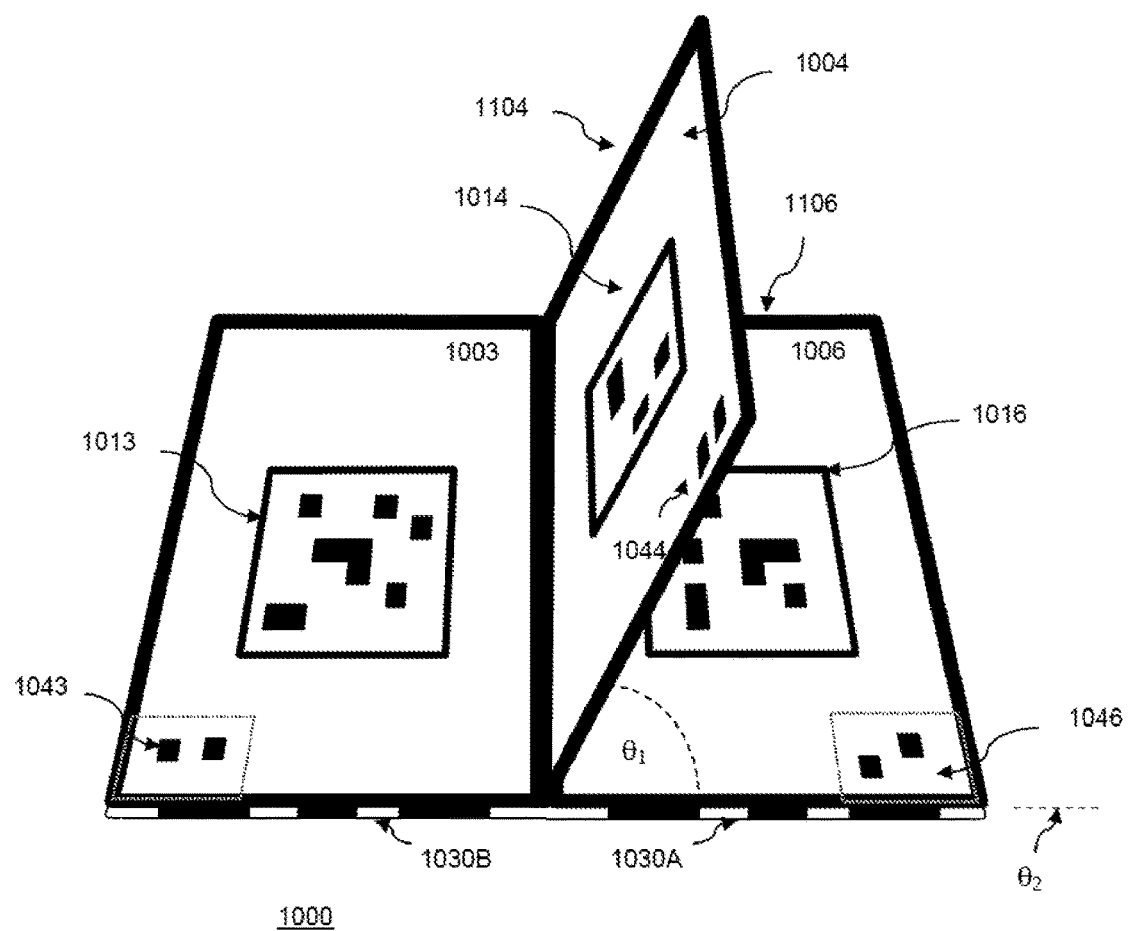
FIG. 9 is a schematic diagram of a book in accordance with an embodiment of the present invention.

More generally, and referring to FIG. 9, it will be appreciated that the state of the book itself may be evaluated as a function of a number of estimated sources or evidence, including some or all selected from the non-exhaustive list consisting of:

the identity of one or more fiduciary markers (1013, 1014, 1016);
the position and orientation of one or more fiduciary markers (1013, 1014, 1016);
the degree of occlusion of one or more fiduciary markers (e.g. 1016);
the identity of one or more non-alphanumeric patterns (1043, 1044, 1046);
the identity of a turning leaf (1004, 1014, 1044),
the angular position $\theta_1$ of a turning leaf (1004);
the angular position $\theta_2$ of one or more cover-edge patterns; and
the visibility of features for a range of states given some or all of the above.

Further sources of evidence may for example be the state of the book as estimated in the previous N video image frames, where N may be between 1 and 10, as a non-limiting example, and derivatives of these states with respect to time (for example velocity for key points on the book) for the purposes of predicting the book's position in the current video image.

As noted previously, some of the above estimations may also have confidence values associated with them. It will also be appreciated that different estimates may be obtained at different times, and that different estimates may be assumed to be valid for different periods of time, or may be rendered unreliable by contradictory or new evidence.

Accordingly, in an embodiment of the present invention, the AR application evaluates the partial information about the state of the book obtained represented by the available evidence, and in conjunction with the physical constraints of the book, combines the evidence to estimate the current state of the book for the purposes of faithfully replacing it with an augmented version in an output augmented video image.

In a first step, the AR application evaluates the available evidence based on a scoring metric.

The scoring metric assigns scores to evidence based upon the indicated confidence in the evidence and optionally a weighting of inherent reliability in the evidence.

Thus for example for an equal level of confidence, the identification of a fiduciary marker is likely to score higher than the estimate of a page angle. This is because each fiduciary marker in the book is chosen to be distinctive and furthermore represents one of a very small subset all possible markers, and so a reasonable match with the reference marker in the AR application is inherently likely to be strong evidence for the positive identification of the marker and hence also at least the partial visibility of that marker's page.

Meanwhile the confidence level for the angle of a turning leaf may be a function of the score indicating how close an identified edge is to a hypothesised edge in the method of FIG. 5, and may optionally be further weighted according the hypothesised edge's consistency with an expected range of angles, as described previously.

Meanwhile the score for a fiduciary marker may be based on the accuracy of match between the marker and the reference model for the marker (and as noted previously is likely to be very high) whilst the confidence score for the orientation, rotation and position of the marker may be weighted responsive to the effective resolution of the marker in the image (e.g. the number of pixels used to represent it in the video image) since this also limits the effective resolution of the orientation and rotation estimates.

Scores for pieces of evidence relating to other respective aspects of the book will be apparent to the skilled person.

In a second step, the AR application takes that evidence with the highest score that is needed in order to construct a minimum 'base pose' for the book.

Hence for example it may take the highest scoring identification of a visible fiduciary marker as evidence of where the book is opened to, and the highest scoring position, orientation etc., of one or more markers (probably the same one) as indicative of the book's position and orientation and also for the axis of the spine.

Hence the model of the state of the book is initially constrained by this highest scoring evidence; subsequent evidence needs to be consistent with the presence of the visible pages and the axis of the spine of the book, for example.

In a third step, the AR application runs through the available evidence in a predetermined order of priority to select evidence that can be classified as 'verified'. Verified evidence is that which has a confidence value (score) that exceeds a respective predetermined threshold for that evidence type.

The verified evidence is compared against the constraints upon the book imposed by the base pose.

Hence for example if the base pose indicates that pages 1 and 4 are visible, this in turn indicates that the leaf comprising pages 2 and 3 is in the process of turning. At certain angles, the fiduciary marker on either page 2 or page 3 may still be reliably identifiable and so the leaf and its angle may be verifiably confirmed.

In this way, additional information about the state of the book may be used, in conjunction with the physical constraints of the book and the constraints imposed by preceding evidence, to further constrain the possible state of the book. By running through the evidence types in a predetermined order of priority, the verified evidence imposes additional restrictions on the possible state of the book in that predetermined order.

Hence for example, the verified identify of all resolvable pages from fiduciary markers may be the first priority. This restricts the possible state of the book with regards to the subsequent evaluation of evidence for non-alphanumeric patterns and which (if any) unidentified leaves of the book are being turned, and by what angles.

Note that the criteria for verification may not be limited to evidence from the present video frame. In order to improve the confidence in the available evidence, certain sources of evidence may make use of historical data. For example if a fiduciary marker is identified and its position, orientation etc., is consistent with the fiduciary marker at substantially the same position, orientation etc., in the previous video image, then this may be used to increase the confidence in the identity and position of the marker and hence its score. However, if the identity of the marker in the current image differs from that in the previous image (or previous N images) then the confidence in that identity may be substantially decreased.

Consequently for certain evidence (in particular, for fiduciary markers), the 'verified' criterion will be a very strong indicator of accuracy.

However, it will be appreciated that it is nevertheless possible for verified evidence to contradict the constraints already imposed by earlier evidence. If this happens, then in an embodiment of the present invention AR application can continue, but check how many pieces of verified evidence contradict model.

If two or more pieces of verified evidence contradict the model, then optionally a failure mode may be triggered in which the book relies on prediction from previous frames to construct some or all of the state of the book.

Meanwhile if only one piece of verified evidence contradicted the constraints imposed by the earlier evidence, then optionally either the failure mode may be used, or alternatively this item of evidence may be used to substitute the contradicting element of evidence in the model, in order to construct a second model.

Hence for example if a verified non-alphanumeric pattern contradicts a verified fiduciary marker on the same page, then in an embodiment of the present invention this will initialise a new second model in which the fiduciary marker is rejected in favour of the evidence from the non-alphanumeric pattern, thereby forming a competing model.

This is because for example it is possible that the verified evidence is correct for both the fiduciary marker and the non-alphanumeric pattern, but the inconsistency is due to a failure to identify that the page with the fiduciary marker has actually begun to turn, revealing the contradictory non-alphanumeric pattern on the next page. By evaluating both models in parallel, it is possible that additional evidence may resolve this error. It will be appreciated however that if the second model is then contradicted by other verified evidence, this may be treated as prima facie evidence that the second model (and hence also the verified evidence that caused it to be created) is incorrect, enabling the second model to be quickly discarded.

Conversely, some classes of verified evidence may not be used as basis for either entering a failure mode or forming a second base pose. Generally this would be evidence that is inherently less reliable or is insufficient to construct a base pose with. As non-limiting examples, evidence from the cover edges, or from a page turning angle, may not be used as basis in this fashion.

Thus by the end of the third step, in embodiments of the present invention one of three outcomes is possible:
i. the state of the book defined in the base pose has been further constrained by consistent verified evidence (for example for page positions and the like);
ii. the model of the book has been contradicted by verified evidence to the extent that a failure mode is initialized; or
iii. the model of the book has been contradicted by verified evidence and a second model has been generated and also checked against the verified evidence.

That is to say, in a variant embodiment of the present invention, only outcome i. is possible (with contradictory verified evidence being ignored), whilst in another variant embodiment of the present invention, outcomes i. or ii. are possible (where inconsistency checks are used to trigger a failure mode). In another variant embodiment of the present invention, outcomes i. or iii. are possible (where an inconsistency check may lead to an additional candidate model being generated), whilst in another variant embodiment of the present invention, outcomes i., ii. or iii. are possible (where outcomes ii. and iii. depend on the severity of inconsistency).

It will also be appreciated that the evidence having the highest scores as used in the second step of generating the original base pose is likely to also be verified evidence. However, where for some reason the overall levels of evidence in the system have low confidence (for example in the case of poor light, or the book being taken too far from the camera, or being occluded to a large extent), then a base pose based upon one or more items of unverified evidence may have a warning flag associated with it, or may cause an immediate initialisation of the failure mode.

In an optional fourth step, then assuming that a failure mode has not been initialised, the remaining, non-verified evidence (i.e. evidence not having a confidence threshold above a predetermined level for that category of evidence) is assessed, again preferably in a predetermined order of priority. Notably unverified evidence may also have to satisfy a minimum confidence threshold to be assessed. This threshold may be compared against at this fourth step, or may be implemented during the evidence gathering process by not outputting the evidence at all if this minimum threshold is not satisfied.

Where non-verified evidence is consistent with the AR application's current estimate of the state of the book (as defined by the or each current model) then the unverified evidence can be used to further define the state of the book. If the unverified evidence is inconsistent with the AR application's current estimate of the state of the book, then in an embodiment of the present invention it is simply ignored.

In this way, the unverified evidence can be used to fill in gaps or refine values in the estimate of the state of the book once that state has already been constrained by the verified evidence—but not vice-versa.

If at this stage two estimates of the state of the book exist (based upon two models as described previously), then the model that was consistent with the most and best evidence (verified and unverified) may be selected. The selection may be done for example by using a running total of the scores for the evidence considered consistent with each of the competing book states, and choosing the model with the highest overall score. In the event of a tie, then the state of the book based upon the original book pose may be chosen.

The finally, in an optional fifth step the AR application may evaluate what remaining aspects of the state description of the book are indeterminate or have not been narrowed down to a sufficiently accurate degree for the purposes of generating the augmented version of the book for the current video image. In response the AR application applies heuristics to fill in the missing information. These will typically fall into one of three kinds:

Firstly, assumptions consistent with the current base pose; for example referring to FIG. 8A, it can be assumed that the page between identifiable pages 4 and 6 will be page 5; this may enable some animated augmentation relating to the opening of that page, such as a light projecting out of a virtual hole in page 5 and shining onto page 6 before page 5 can be positively identified.

Secondly, predictions or duplications from a previous book state. For example, where user's hand temporarily occludes a fiduciary marker, but the border pattern on the book indicates no major movement of the book and no turning leaf have been detected close to the marker, then the identity of the page can be duplicated from the previous state (if there is no turning leaf detected at all then of course it can also be estimated from the identity of the opposing leaf; ambiguity occurs when there is a turning leaf as it may not be immediately known how many leaves are being turned at one and hence the relationship between the visible other marker and the occluded marker).

Thirdly, interpolations or extrapolations. For example, where an edge of the book is not visible, the physical model of the book may be used to interpolate or extrapolate from the visible evidence to fill in the missing elements of the book.

It will be appreciated that these heuristics, and also aspects such as the thresholds for verification, may be customised by a game designer as they see fit, and may also be variable as a function of time or event. For example if the game designer knows that they are about to ask the user to spin the book around to make a virtual character dizzy, or fly the book like a magic carpet, then they may wish to lower the verification thresholds or ease heuristic criteria in order to provide fewer switches to a failure mode (which is based heavily on prediction) when there will be unpredictable motion between video frames.

Figure 10:
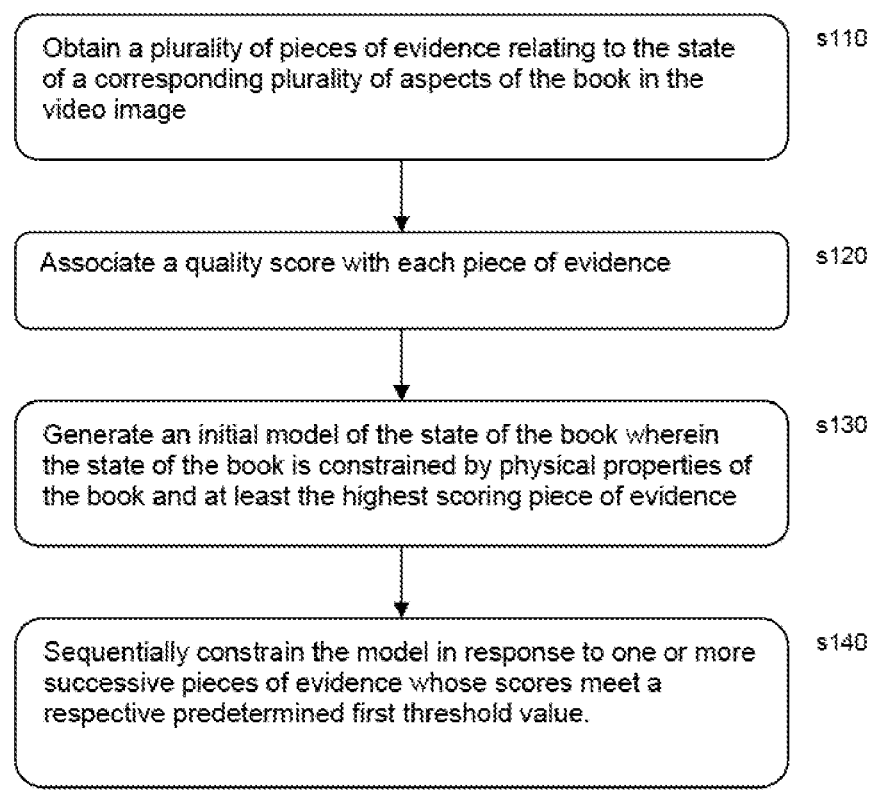
FIG. 10 is a flow diagram of a method of generating an internally consistent model of the state of a book in accordance with an embodiment of the present invention.

Turning now to FIG. 10, then as described previously herein a method of generating an internally consistent model of the state of a book captured in a video image comprises:

in a first step s110, obtaining a plurality of pieces of evidence relating to the state of a corresponding plurality of aspects of the book in the video image;

in a second step s120, associating a quality score with each piece of evidence;

in a third step s130, generating an initial model of the state of the book wherein the state of the book is constrained by physical properties of the book and at least the highest scoring piece of evidence; and in a fourth step s140, sequentially constraining the model in response to one or more successive pieces of evidence whose scores meet a respective predetermined first threshold value.

It will be apparent to a person skilled in the art that variations in the above method corresponding to operation of the various embodiments of the apparatus as described and claimed herein are considered within the scope of the present invention, including but not limited to:

the step of sequentially constraining the initial model is performed in a predetermined order responsive to evidence type;

sequentially constraining the model in response to one or more successive pieces of evidence whose scores do not meet the respective predetermined first threshold value, if the or each successive piece of evidence is consistent with the current state of the model, where the or each piece of evidence might be only used if its score meet a respective predetermined second threshold value lower than the first threshold value;

one or more respective first threshold values change responsive to an event in a videogame;

the evidence comprises one or more selected from the list consisting of:

the identity of one or more fiduciary markers of the book;

the position of one or more fiduciary markers of the book;

the orientation of one or more fiduciary markers of the book;

the degree of occlusion of one or more fiduciary markers of the book;

the identity of one or more non-alphanumeric patterns of the book;

the identity of a turning leaf of the book, the angular position $\theta_1$ of a turning leaf of the book; and the angular position $\theta_2$ of one or more cover-edge patterns of the book; and more generally, a method of generating an augmented reality image comprises capturing an video image comprising an image of a book, generating an internally consistent model of the state of the book captured in the video image in accordance with any of the methods described herein, rendering a computer graphic book responsive to the generated model of the state of the book, and augmenting the captured video image with the rendered computer graphic book.

Corresponding apparatus, such as an entertainment device in the form of a PS3, may similarly implement any of the above methods and techniques.

Consequently in a summary embodiment of the present invention, an entertainment device (such as the PS3 10) for generating an internally consistent model of the state of a book captured in a video image comprises an input (e.g. a USB port 710) for receiving a video image comprising an image of the book, an image processor (e.g. reality synthesiser 200, Cell processor 100, or a combination of the two) operable to obtain a plurality of pieces of evidence relating to the state of a corresponding plurality of aspects of the book in the video image, where the image processor can also associate a quality score with each piece of evidence; and a processor (e.g. the Cell processor 100) operable to generate an initial model of the state of the book wherein the state of the book is constrained by physical properties of the book and at least the highest scoring piece of evidence, the processor also operable to sequentially constrain the model in response to one or more successive pieces of evidence whose scores meet a respective predetermined first threshold value.

As noted previously, consequently the model of the book is sequentially constrained first by the highest scoring evidence and then by trusted evidence (verified evidence), such that subsequent evidence is only used to further constrain an existing model of the book when it is consistent with the current constraints of the model of the book, thereby generating an overall internally consistent model of the book based upon strong evidence from the video image.

In an instance of the summary embodiment, the processor is operable to sequentially constrain the model in a predetermined order responsive to evidence type.

In an instance of the summary embodiment, the processor is operable to sequentially constrain the model in response to one or more successive pieces of evidence whose scores do not meet the respective predetermined first threshold value, if the or each successive piece of evidence is consistent with the current state of the model.

In an instance of the summary embodiment, one or more respective first threshold values change responsive to an event in a videogame run by the entertainment device.

In an instance of the summary embodiment, the image processor is operable to render a computer graphic book responsive to the generated model of the state of the book, and the image processor is operable to augment the captured video image with the rendered computer graphic book.

It will be appreciated that the entertainment device as described herein may form part of an augmented reality system comprising a video camera (e.g. an EyeToy or Playstation Eye 756) arranged in operation to be coupled to the entertainment device; and a book (1000) comprising a respective fiduciary marker (1011, 1012, 1013, 1014, 1015, 1016) on a plurality of pages.

As noted previously, the PS3 implements the above techniques and methods under suitable software instruction. Hence it will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a non-transitory computer program product or similar object of manufacture comprising processor implementable instructions stored on a data carrier such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, if applicable the computer program may take the form of a transmission via data signals on a network such as an Ethernet, a wireless network, the Internet, or any combination of these or other networks.

Although illustrative embodiment of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of generating an internally consistent model of a state of a book captured in a video image, the method comprising the steps of:
    obtaining a plurality of pieces of evidence relating to a current state of a corresponding plurality of different aspects of the book in the video image, the obtained pieces of evidence including an identity of one or more fiduciary markers and an angular position $\theta_1$ of a turning leaf of the book;
    associating a score with each piece of evidence based on one or more estimates for the piece of evidence;
    generating an initial model of the current state of the book, wherein the current state of the book is constrained by physical properties of the book and at least the highest scoring piece of evidence from among the obtained plurality of pieces of evidence; and
    sequentially constraining the model in response to one or more successive pieces of the obtained evidence whose scores meet a respective predetermined first threshold value.

2. A method according to claim 1, in which the step of sequentially constraining the initial model is performed in a predetermined order responsive to evidence type.

3. A method according to claim 1, comprising the subsequent step of:
    sequentially constraining the model in response to one or more successive pieces of evidence whose scores do not meet the respective predetermined first threshold value, if one or more of the successive pieces of evidence are consistent with the current state of the model.

4. A method according to claim 3, in which at least one of the pieces of evidence is only used if its score meet a respective predetermined second threshold value lower than the first threshold value.

5. A method according to claim 1 in which one or more of the respective first threshold values change responsive to an event in a videogame.

6. A method according to claim 1, in which the evidence comprises one or more selected from a list consisting of:
    a position of one or more fiduciary markers of the book;
    an orientation of one or more fiduciary markers of the book;
    a degree of occlusion of one or more fiduciary markers of the book;
    an identity of one or more non-alphanumeric patterns of the book;
    an identity of a turning leaf of the book; and
    an angular position $\theta_2$ of one or more cover-edge patterns of the book.

7. A method according to claim 1, in which the evidence comprises one or more selected from a list consisting of:
    the state of the book as estimated in a predetermined number of previous video image frames; and
    a derivative of the book as estimated in the predetermined number of previous video image frames with respect to time.

8. The method of claim 1, wherein the one or more estimates for the piece of evidence include at least one of a relative angle or a relative completeness of the piece of evidence in the current state of the book.

9. A non-transitory computer program product comprising instructions that, when executed on a computer, implement a method of generating an internally consistent model of a current state of a book captured in a video image, the method comprising the steps of:
- obtaining a plurality of pieces of evidence relating to a current state of a corresponding plurality of different aspects of the book in the video image, the obtained pieces of evidence including an identity of one or more fiduciary markers and an angular position $\theta$ of a turning leaf of the book;
- associating a score with each piece of evidence based on one or more estimates for the piece of evidence;
- generating an initial model of the current state of the book wherein the current state of the book is constrained by physical properties of the book and at least the highest scoring piece of evidence from among the obtained plurality of pieces of evidence; and
- sequentially constraining the model in response to one or more successive pieces of the obtained evidence whose scores meet a respective predetermined first threshold value.

10. An entertainment device for generating an internally consistent model of a current state of a book captured in a video image, the device comprising:
- an input configured to receive a video image comprising an image of the book;
- an image processor configured to obtain a plurality of pieces of evidence relating to a current state of a corresponding plurality of different aspects of the book in the video image, the obtained pieces of evidence including an identity of one or more fiduciary markers and an angular position $\theta_1$ of a turning leaf of the book,
- the image processor being configured to associate a score with each piece of evidence based on one or more estimates for the piece of evidence;
- a processor configured to generate an initial model of the current state of the book, wherein the current state of the book is constrained by physical properties of the book and at least the highest scoring piece of evidence from among the obtained plurality of pieces of evidence, and
- the processor is configured to sequentially constrain the model in response to one or more successive pieces of the obtained evidence whose scores meet a respective predetermined first threshold value.

11. An entertainment device according to claim 10, in which the processor is configured to sequentially constrain the model in a predetermined order responsive to evidence type.

12. An entertainment device according to claim 10, in which the processor is configured to sequentially constrain the model in response to one or more successive pieces of evidence whose scores do not meet the respective predetermined first threshold value, if one or more of the successive piece of evidence are consistent with the current state of the model.

13. An entertainment device according to claim 10 in which one or more of the respective first threshold values change responsive to an event in a videogame run by the entertainment device.

14. An entertainment device according to claim 10, in which the evidence comprises one or more selected from the list consisting of:
- a position of one or more fiduciary markers of the book;
- an orientation of one or more fiduciary markers of the book;
- a degree of occlusion of one or more fiduciary markers of the book;
- an identity of one or more non-alphanumeric patterns of the book;
- an identity of a turning leaf of the book; and
- an angular position $\theta_2$ of one or more cover-edge patterns of the book.

15. An entertainment device according to claim 10, in which:
- the image processor is configured to render a computer graphic book responsive to the generated model of the state of the book; and
- the image processor is configured to augment the captured video image with the rendered computer graphic book.

16. An augmented reality system, comprising:
- an entertainment device according to claim 10;
- a video camera arranged in operation to be coupled to the entertainment device; and
- a book comprising a respective fiduciary marker on a plurality of pages.

17. A system according to claim 16, in which the evidence comprises one or more selected from a list consisting of:
- the state of the book as estimated in a predetermined number of previous video image frames; and
- a derivative of the book as estimated in the predetermined number of previous video image frames with respect to time.

18. A device according to claim 10, in which the evidence comprises one or more selected from a list consisting of:
- the state of the book as estimated in a predetermined number of previous video image frames; and
- a derivative of the book as estimated in the predetermined number of previous video image frames with respect to time.

* * * * *